(12) United States Patent
Jung et al.

(10) Patent No.: US 8,681,305 B2
(45) Date of Patent: Mar. 25, 2014

(54) LIQUID CRYSTAL DISPLAY DEVICE COMPRISING A COMMON LINE PATTERN FORMED CORRESPOND TO THE CONDUCTIVE SEAL PATTERN, A TRANSPARENT ELECTRODE PATTERN OVERLAPPING THE COMMON LINE PATTERN WITH AN INSULATING LAYER INTERPOSED THERE BETWEEN, THE TRANSPARENT ELECTRODE PATTERN HAVING A WIDTH EQUAL TO OR LESS THAN THAT OF THE COMMON LINE PATTERN

(75) Inventors: Yu-Ho Jung, Chilgok-gu (KR); Young-Seok Choi, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 1141 days.

(21) Appl. No.: 12/633,710

(22) Filed: Dec. 8, 2009

(65) Prior Publication Data
US 2010/0157231 A1    Jun. 24, 2010

(30) Foreign Application Priority Data

Dec. 24, 2008  (KR) .......................... 10-2008-0132990
Oct. 12, 2009  (KR) .......................... 10-2009-0096717

(51) Int. Cl.
*G02F 1/1345*    (2006.01)
*G02F 1/1339*    (2006.01)

(52) U.S. Cl.
USPC ............ 349/149; 349/143; 349/152; 349/153

(58) Field of Classification Search
USPC .................................. 349/143, 149, 151–153
See application file for complete search history.

(56) References Cited

U.S. PATENT DOCUMENTS

| | | | |
|---|---|---|---|
| 2003/0117541 A1 | 6/2003 | Kim et al. | |
| 2005/0062898 A1* | 3/2005 | Imayama et al. | 349/43 |
| 2006/0274250 A1* | 12/2006 | Ono et al. | 349/141 |
| 2008/0002134 A1* | 1/2008 | Jeong | 349/153 |

FOREIGN PATENT DOCUMENTS

| | | |
|---|---|---|
| KR | 10-2007-0003165 A | 1/2007 |
| KR | 10-2008-0001061 A | 1/2008 |

* cited by examiner

*Primary Examiner* — Huyen Ngo
(74) *Attorney, Agent, or Firm* — Birch, Stewart, Kolasch & Birch, LLP

(57) ABSTRACT

A liquid crystal display device and a method for manufacturing the same, are discussed. The liquid crystal display device includes first and second substrates each having an active area and a non-active area, gate lines and data lines formed on the active area of the first substrate to define a plurality of pixel areas, thin film transistors formed at intersections of the gate and data lines, pixel electrodes, a common electrode formed over the second substrate, a conductive seal pattern between the first and second substrates, a common line pattern formed on the first substrate to correspond to the conductive seal pattern, and a transparent electrode pattern overlapping the common line pattern with an insulating layer interposed therebetween, the transparent electrode pattern having a width equal to or less than that of the common line pattern.

11 Claims, 7 Drawing Sheets

LIQUID CRYSTAL DISPLAY DEVICE COMPRISING A COMMON LINE PATTERN FORMED CORRESPOND TO THE CONDUCTIVE SEAL PATTERN, A TRANSPARENT ELECTRODE PATTERN OVERLAPPING THE COMMON LINE PATTERN WITH AN INSULATING LAYER INTERPOSED THERE BETWEEN, THE TRANSPARENT ELECTRODE PATTERN HAVING A WIDTH EQUAL TO OR LESS THAN THAT OF THE COMMON LINE PATTERN

This application claims the benefit of Korean Patent Applications No. 10-2008-0132990, filed on Dec. 24, 2008 and No. 10-2009-0096717, filed on Oct. 12, 2009, which are hereby incorporated by references as if fully set forth herein.

BACKGROUND OF THE INVENTION

1. Field of the Invention

The present invention relates to a liquid crystal display device and more particularly, to a liquid crystal display device and a method for manufacturing the same, in which formation of patterns on a lower substrate is controlled to prevent a seal detachment problem when a conductive seal is used to connect the lower substrate to an upper substrate so as to apply a signal to a common electrode of the upper substrate.

2. Discussion of the Related Art

With growth of an information based society, demands for display devices are gradually increasing. To meet these demands, recently, various kinds of flat panel display devices, such as a Liquid Crystal Display (LCD) device, Plasma Display Panel (PDP), Electro Luminescent Display (ELD), Vacuum Fluorescent Display (VFD), etc., have been studied. Some of these display devices have already been utilized in various equipment.

Of the above mentioned display devices, due to high image quality, low weight, thin thickness, and low power consumption characteristics and other advantages, a liquid crystal display device has been most frequently used as a mobile image display device substituting for a Cathode Ray Tube (CRT). Specifically, various liquid crystal display devices have been developed and used not only as a mobile display device, such as a monitor of a laptop computer, but also as a monitor of a desktop computer and a television having a function of receiving and displaying broadcast signals.

To apply these liquid crystal display devices as a general screen display device into various fields, it is important that a liquid crystal display device can realize a high-resolution, high-brightness and a large-area screen image while maintaining characteristics of low weight, thin thickness, and low power consumption characteristics.

Hereinafter, a conventional liquid crystal display device will be described with reference to the accompanying drawings.

FIG. 1 is a plan view of a conventional liquid crystal display device, FIG. 2 is an enlarged view of the portion A of FIG. 1, and FIG. 3 is a sectional view taken along the line I-I' of FIG. 2.

As shown in FIG. 1, the conventional liquid crystal display device includes an upper substrate 30, a lower substrate 1 having a larger border area than the upper substrate 30 for formation of a pad portion, and a liquid crystal layer (not shown) filled between the upper substrate 30 and the lower substrate 1.

Each of the upper plate 30 and the lower plate 1 is centrally defined with an active area A/A. A seal pattern 25 is formed around the active area A/A to surround a border of the active area A/A. The seal pattern 25 serves to bond the upper substrate 30 and the lower substrate 1 to each other.

In the above described conventional liquid crystal display device, however, a part of the seal pattern 25 may exhibit deterioration in adhesive strength with respect to an opposite substrate (i.e., the upper substrate or the lower substrate), causing a seal detachment problem wherein the seal pattern peels away from a surface of the opposite substrate. The seal detachment problem may appear as leakage of light at a corresponding region and thus, there is presented an effort to solve this problem.

Now, a reason behind the seal detachment will be described via consideration of the portion A of the conventional liquid crystal display device. FIGS. 2 and 3 illustrate the portion A in enlarged scale.

The lower substrate 1 is formed, on a region thereof corresponding to the seal pattern 25, with a common electrode pattern 20, a gate insulating layer 15 and a protection layer 16 covering the common electrode pattern 20, a contact hole 18 defined by removing predetermined regions of the gate insulating layer 15 and the protection layer 16 to expose the common electrode pattern 20, and a transparent electrode pattern 13 connected to the common electrode pattern 20 through the contact hole 18.

The upper substrate 30 is formed with a black matrix layer 31, an overcoat layer 32, and a common electrode 33.

Here, the common electrode 33 and the transparent electrode pattern 13 are electrically connected to each other via the seal pattern 25 made of a conductive material.

The seal pattern 25 is made of a photo-curable conductive material, and is cured when Ultra-Violet (UV) light is irradiated to the lower substrate 1 or the upper substrate 30. In this case, due to the fact that the black matrix layer 31 is applied to the upper substrate 30 thus acting to prevent light from being irradiated to the seal pattern 25 through the upper substrate 30, UV light is irradiated from the bottom of the lower substrate 1, so as to realize curing of the seal pattern 25.

However, the lower substrate 1 includes the common electrode pattern 20 made of a light shielding metal and extending in a predetermined width or more and in turn, the transparent electrode pattern 13 is formed above the common electrode pattern 20 to have a greater width than the common electrode pattern 20.

Although the transparent electrode pattern 13 is made of a transparent material, the presence of the transparent electrode pattern 13 may reduce light transmissivity by about 18% as compared to when the transparent electrode pattern 13 is absent. Therefore, when UV light is irradiated to the transparent electrode pattern 13, the transparent electrode pattern 13 does not transmit all of the incident light, causing incomplete curing of a sealant. Accordingly, the sealant above the transparent electrode pattern 13 may have a deteriorated photo curing degree and in particular, may be easily affected by extreme environment, more particularly, under conditions of a high-temperature of 60° C. or more, high-humidity, and low-temperature. This disadvantageously increases a possibility of sealant detachment.

In this case, since a part of the seal pattern 25, above the common electrode pattern 20 made of a light shielding metal, has a difficulty in sufficient curing thereof and furthermore, a part of the seal pattern 25, above the transparent electrode pattern 13 around the common electrode pattern 20, has a deteriorated photo curing degree due to a reduction in the transmissivity of UV light, the above described conventional liquid crystal display device has a problem in that the incompletely cured seal pattern 5 may detach from the opposite substrate.

FIG. 4 is a photograph illustrating a seal detachment phenomenon of the conventional liquid crystal display device.

Referring to FIG. 4, there is illustrated a situation in which a seal pattern formed on a lower substrate detaches from an opposite upper substrate. When UV light is irradiated to the lower substrate after a sealant is applied onto a transparent electrode pattern formed on the lower substrate, a common electrode pattern and the transparent electrode pattern do not achieve transmission of a sufficient amount of the UV light, causing incomplete curing of a seal pattern. Therefore, as will be appreciated, the cured sealant has a deterioration in adhesive strength with respect to a common electrode of the upper substrate thereabove, causing formation of a void. With continuous introduction of outside air through the void, there may occur a sealant detachment problem.

Furthermore, as will be appreciated, the seal pattern also has an insufficient adhesive strength with respect to the common electrode pattern of the lower substrate, causing partial seal detachment from the lower substrate. It can be said that this occurs because of low light transmissivity upon photo curing of the sealant as described above. Assuming that the transparent electrode pattern shown in the drawing has a thickness of 40 nm, it was experimentally observed that the light transmissivity drops by about 18% as compared to when the transparent electrode pattern is absent.

The above described conventional liquid crystal display device has the following problems.

In the case of a liquid crystal panel in which a photo-curable conductive seal pattern is used to transmit a signal from a common electrode pattern of a lower substrate to a common electrode of an upper substrate, the greater the width of a transparent electrode pattern below the seal pattern, the lower the light transmissivity. This may cause insufficient abnormal photo curing of a sealant, resulting in a seal detachment problem.

The seal detachment problem may occur even when the common electrode pattern of the lower substrate has a reduced width. Accordingly, it can be appreciated that the curing of the sealant is significantly affected by the presence of the common electrode pattern and the transparent electrode pattern of the lower substrate.

SUMMARY OF THE INVENTION

Accordingly, the present invention is directed to a light crystal display device and a method for manufacturing the same that substantially obviate one or more problems due to limitations and disadvantages of the related art.

An object of the present invention is to provide a liquid crystal display device and a method for manufacturing the same, in which formation of patterns on a lower substrate is controlled to prevent a seal detachment problem when a conductive seal is used to connect the lower substrate to an upper substrate so as to apply a signal to a common electrode of the upper substrate.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device module includes a first substrate and a second substrate arranged opposite each other, each of which includes an active area defined in the center thereof and a non-active area defined around the active area, a plurality of gate lines and data lines formed on the active area of the first substrate and arranged intersecting each other to define a plurality of pixel areas, thin film transistors formed at intersections of the respective gate lines and the respective data lines, pixel electrodes formed in the respective pixel areas, a common electrode formed over the entire surface of the second substrate, a conductive seal pattern configured to surround the non-active area of the first substrate or of the second substrate, a common line pattern formed on the first substrate to correspond to the conductive seal pattern, and a transparent electrode pattern configured to overlap the common line pattern with an insulating layer interposed therebetween, the transparent electrode pattern having a width equal to or less than that of the common line pattern.

The common line pattern may include a plurality of micro-scale lines extending in a direction corresponding to the conductive seal pattern while being spaced apart from one another within a width of the conductive seal pattern, and a common line connecting pattern extending in a direction intersecting the micro-scale lines so as to connect the micro-scale lines to one another.

The transparent electrode pattern may be formed to correspond to a partial longitudinal length of the common line pattern.

The transparent electrode pattern may include a plurality of micro-scale line patterns formed above the micro-scale lines of the common line pattern to correspond to the respective micro-scale lines.

The transparent electrode pattern may be not present between the micro-scale lines of the common line pattern.

The common line pattern may be formed in the same layer as the gate lines and may be made of the same light shielding metal as the gate lines.

The transparent electrode pattern may be formed in the same layer as the pixel electrodes and may be made of the same transparent electrode material as the pixel electrodes.

The transparent electrode pattern may be connected to the micro-scale lines via a plurality of contact holes formed in the insulating layer.

The micro-scale lines may have a width of 5 μm to 50 μm and may be spaced apart from one another by a distance of 5 μm to 50 μm.

The conductive seal pattern may be made of photo curable resin.

The liquid crystal display device may further include a black matrix layer formed on the second substrate to correspond to the conductive seal pattern.

In accordance with another aspect of the present invention, a method for manufacturing a liquid crystal display device includes preparing a first substrate and a second substrate, each of which includes an active area defined in the center thereof and a non-active area defined around the active area, forming a plurality of gate lines and data lines on the active area of the first substrate so that the gate lines and the data lines intersect each other to define a plurality of pixel areas, thin film transistors at intersections of the respective gate lines and the respective data lines, and a common line pattern on the non-active area of the first substrate, forming pixel electrodes in the respective pixel areas, and a transparent electrode pattern overlapping the common line pattern so that the transparent electrode pattern has a width equal to or less than that of the common line pattern, forming a common electrode over the entire surface of the second substrate, forming a conductive seal pattern to surround the non-active area of the first substrate or of the second substrate, forming a liquid crystal layer on the first substrate or the second substrate and bonding the first and second substrates to each other, and curing the conductive seal pattern by irradiating ultraviolet light from the bottom of the first substrate.

The formation of the common line pattern may include forming a plurality of micro-scale lines extending in a given direction while being spaced apart from one another within a width of the conductive seal pattern, and forming a common line connecting pattern extending in a direction intersecting the micro-scale lines so as to connect the micro-scale lines to one another.

The formation of the transparent electrode pattern may include forming a plurality of micro-scale line patterns to correspond to a partial longitudinal length of the common line pattern.

In the formation of the transparent electrode pattern, the plurality of micro-scale line patterns of the transparent electrode pattern may be formed above the micro-scale lines of the common line pattern to correspond to the respective micro-scale lines.

The curing of the conductive seal pattern may be performed by transmitting ultraviolet light through a region where the micro-scale lines of the common line pattern are not formed.

The preparation of the second substrate may include forming a black matrix layer on the active area of the second substrate to correspond to the gate lines, the data lines and the thin film transistors and on the non-active area of the second substrate, and forming a color filter layer on the active area of the second substrate to correspond to at least the pixel areas.

The method may further include interposing an insulating layer, having contact holes to expose a partial upper surface of the respective micro-scale lines, between the common line pattern and the transparent electrode pattern.

In the formation of the transparent electrode pattern, the transparent electrode pattern may be filled in the contact holes so as to be connected to the micro-scale lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
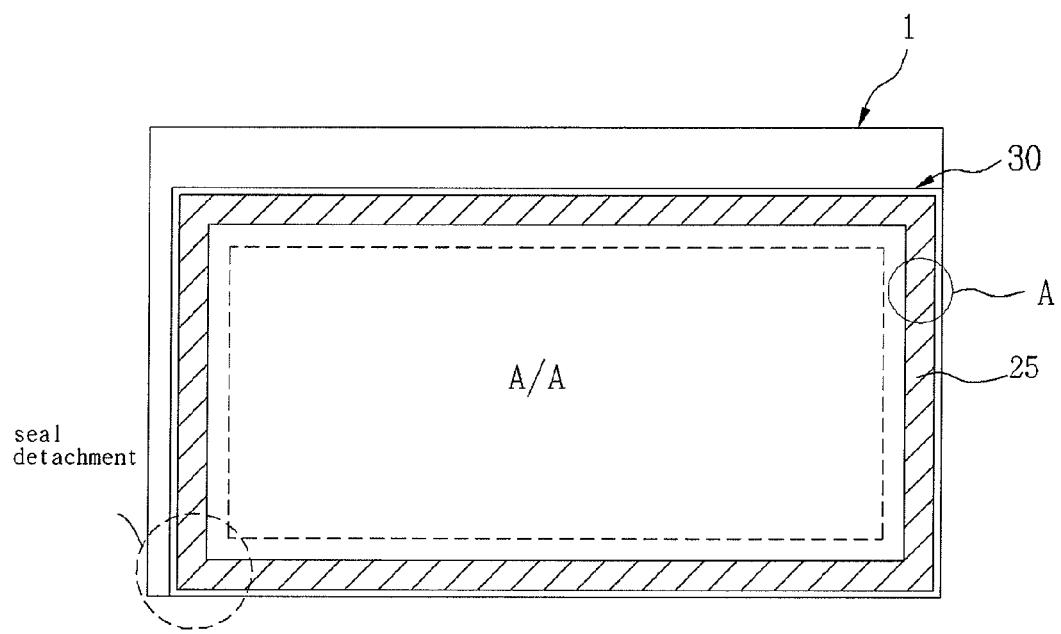
FIG. 1 is a plan view of a conventional liquid crystal display device.
Figure 2:
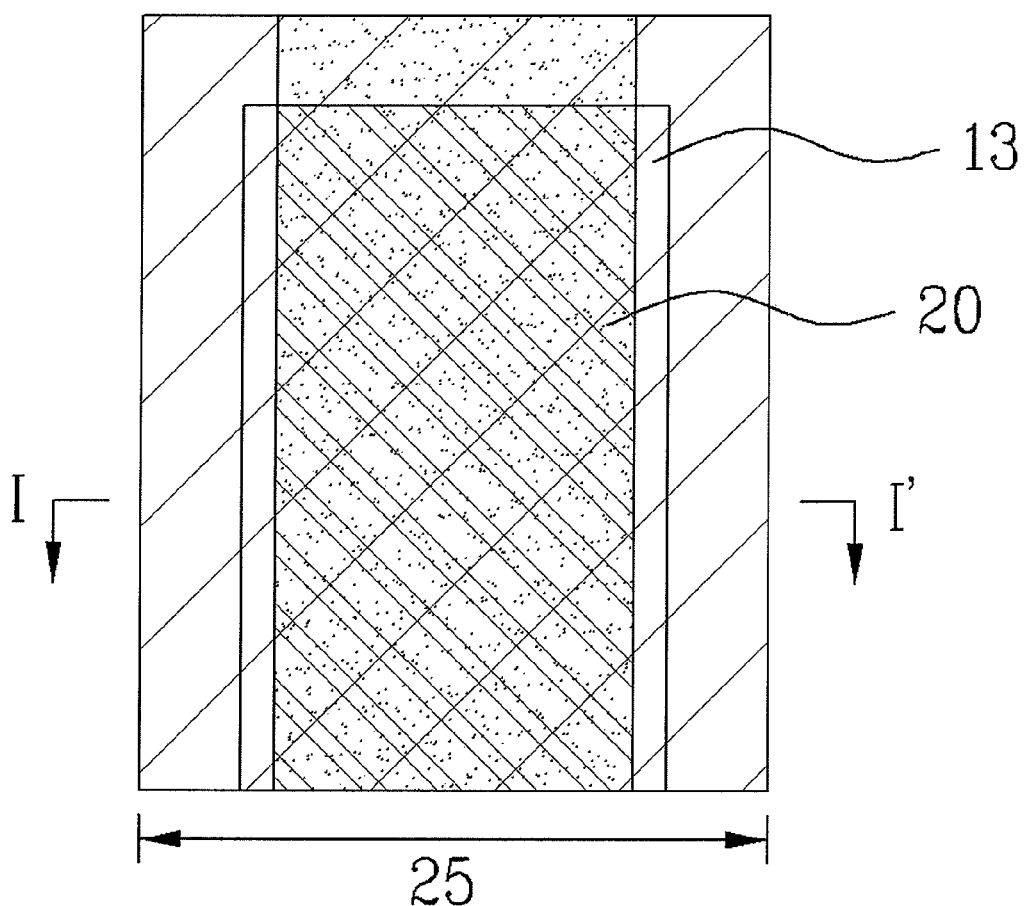
FIG. 2 is an enlarged view of the portion A of FIG. 1.
Figure 3:
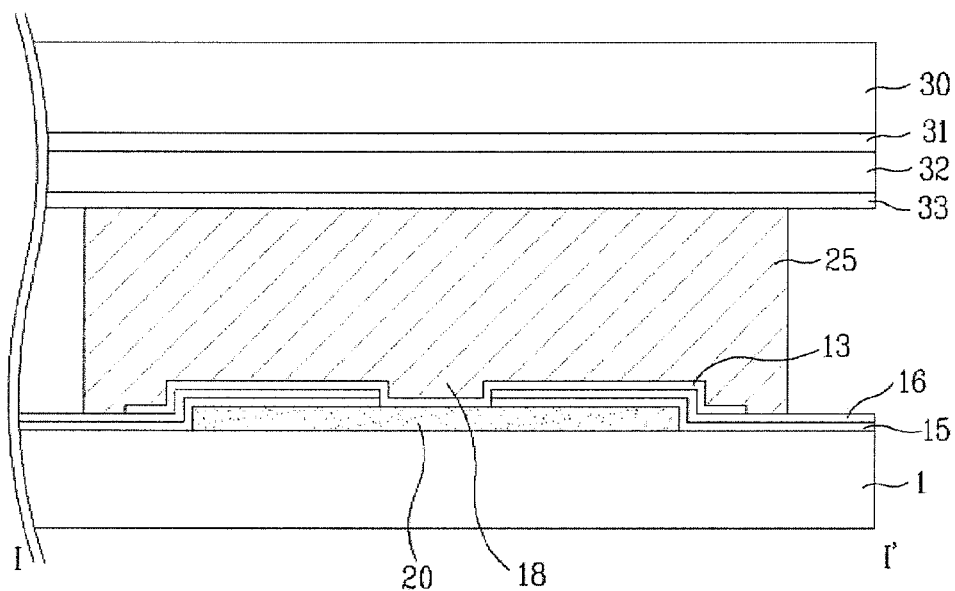
FIG. 3 is a sectional view taken along the line I-I' of FIG. 2.
Figure 4:
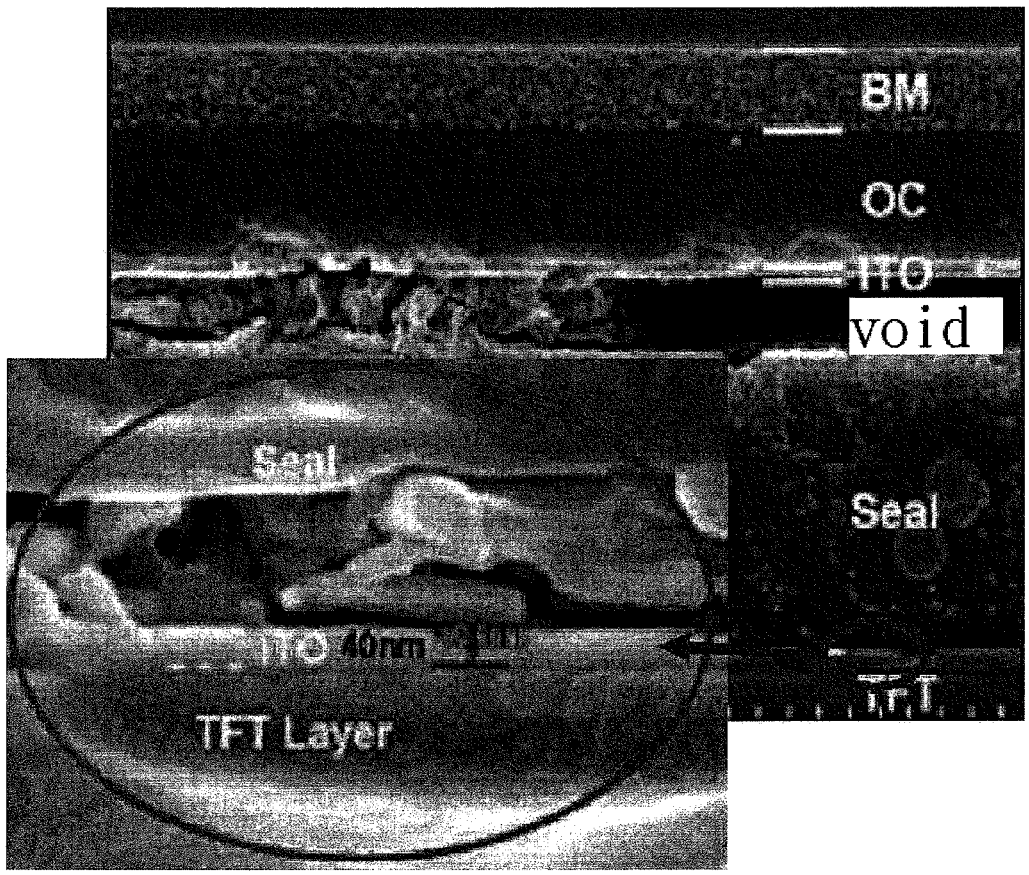
FIG. 4 is a photograph illustrating a seal detachment phenomenon of the conventional liquid crystal display device.
Figure 5:
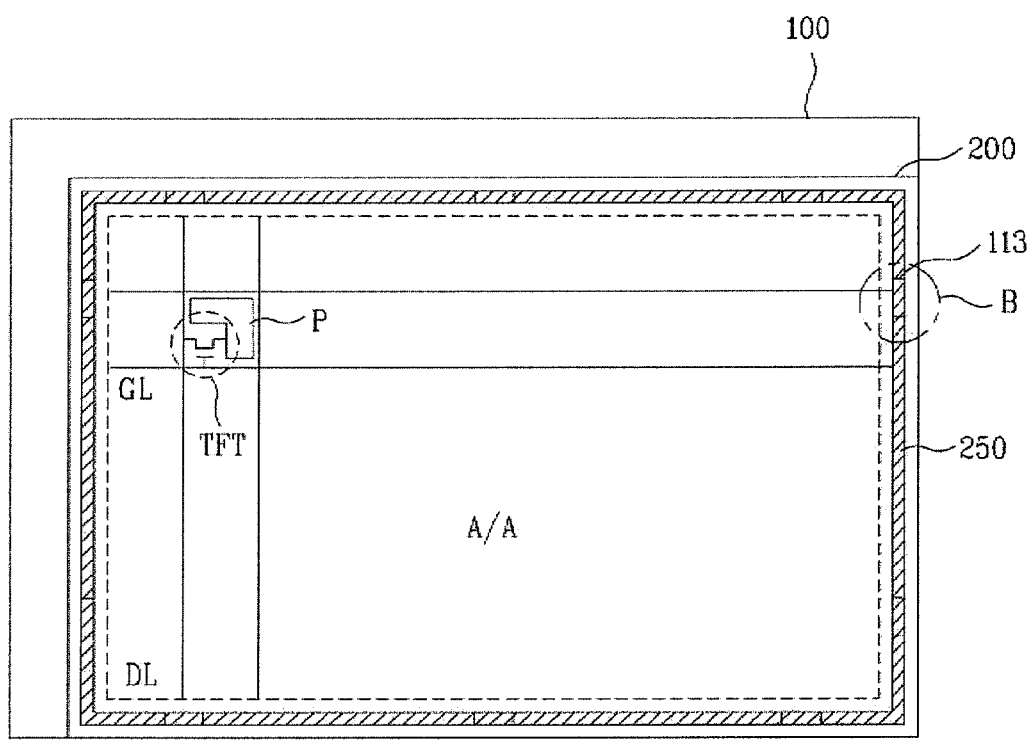
FIG. 5 is a plan view illustrating a liquid crystal display device according to the present invention.
Figure 6:
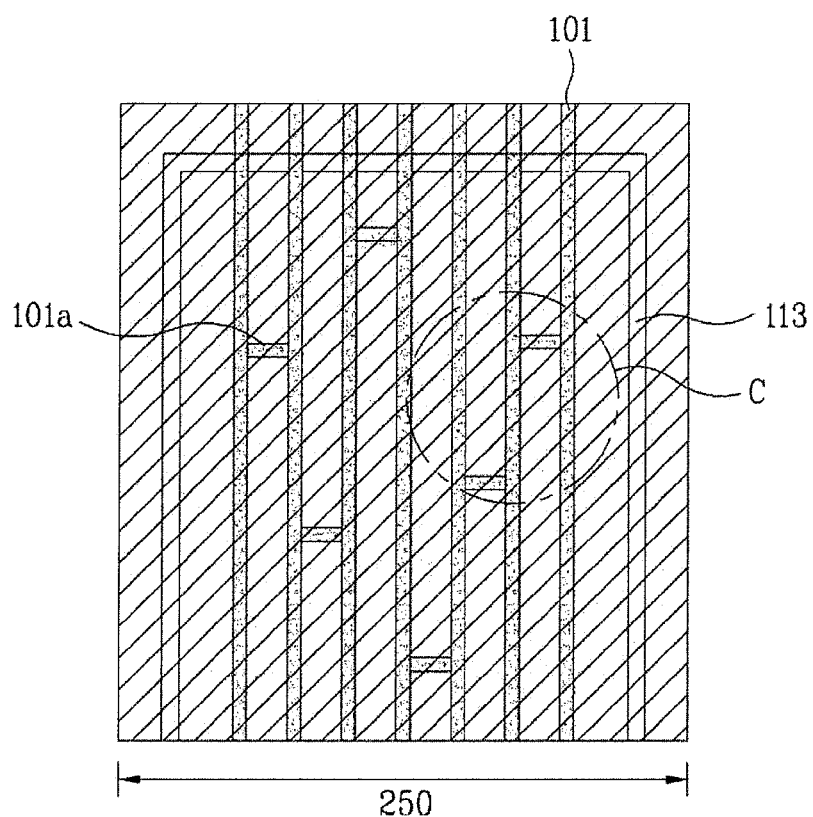
FIG. 6 is an enlarged view of the portion B of FIG. 5.
Figure 7:
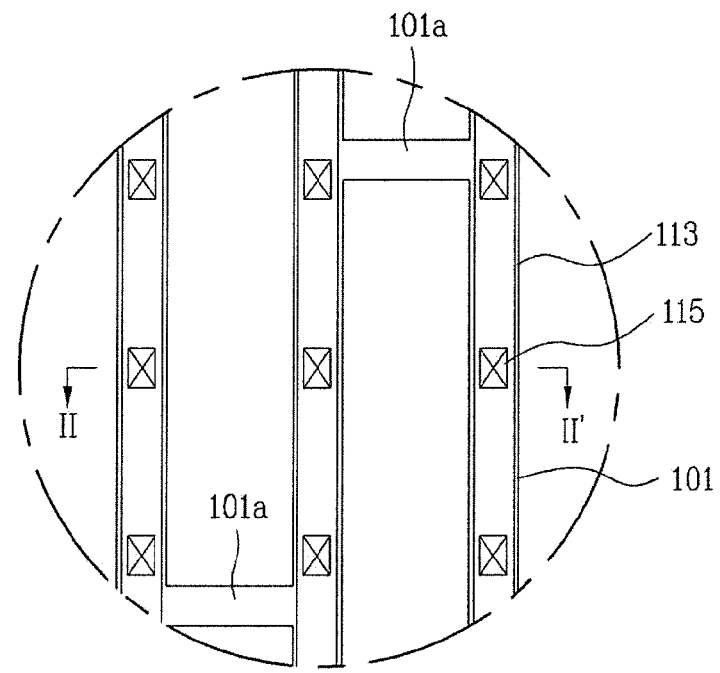
FIG. 7 is an enlarged view of the portion C of FIG. 6.
Figure 8:
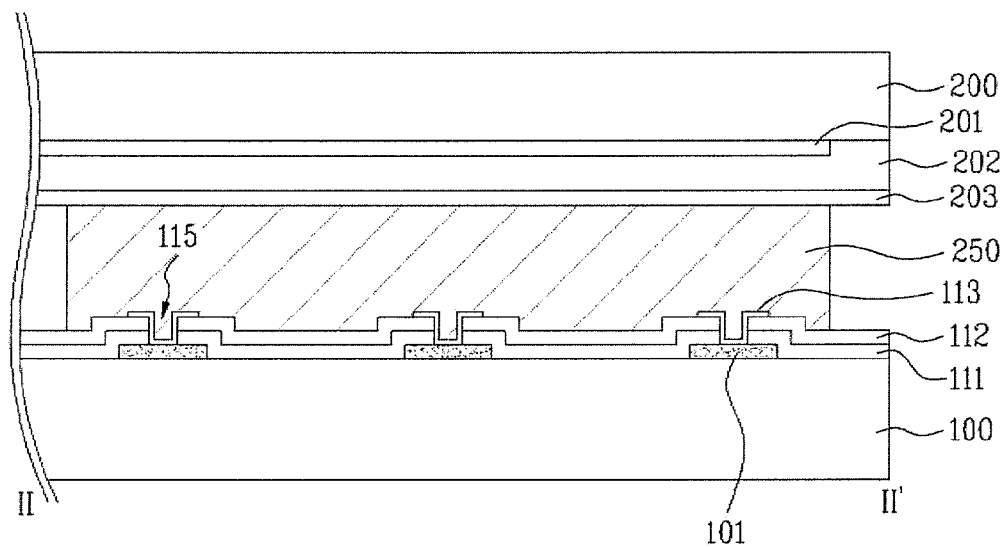
FIG. 8 is a sectional view taken along the line II-II' of FIG. 7.

FIG. 5 is a plan view illustrating a liquid crystal display device according to the present invention, FIG. 6 is an enlarged view of the portion B of FIG. 5, FIG. 7 is an enlarged view of the portion C of FIG. 6, and FIG. 8 is a sectional view taken along the line II-II' of FIG. 7.

As shown in FIGS. 5 to 8, the liquid crystal display device of the present invention includes a first substrate 100 and a second substrate 200 arranged opposite each other, each of which includes an active area A/A defined in the center thereof and a non-active area defined around the active area A/A, a plurality of gate lines GL and data lines DL formed on the active area A/A of the first substrate 100 and arranged intersecting each other to define a plurality of pixel areas, thin film transistors TFT formed at intersections of the respective gate lines GL and the respective data lines DL, pixel electrodes P formed in the respective pixel areas, a common electrode 203 formed over the entire surface of the second substrate 200, a seal pattern 250 configured to surround the non-active area of the first substrate 100 or of the second substrate 200, a common line pattern 101 formed on the first substrate 100 to correspond to the seal pattern 250, and a transparent electrode pattern 113 configured to overlap the common line pattern 101 with insulating layers 111 and 112 interposed therebetween, the transparent electrode pattern 113 having a width equal to or less than that of the common line pattern 101.

A liquid crystal layer (not shown) is filled in spaces in the seal pattern 250 between the first substrate 100 and the second substrate 200.

Here, the seal pattern 250 is cured between the first and second substrates 100 and 200 bonded to each other, achieving adhesive strength with respect to both the substrates 100 and 200. The seal pattern 250 is made of photo-curable conductive resin containing conductive balls therein. With the presence of the seal pattern 250, an electric connection between the common electrode 203, the transparent electrode pattern 113 and the common line pattern 101 is accomplished.

Here, considering a configuration of the second substrate 200 below the common electrode 203, a black matrix layer 201 is formed on the active area A/A of the second substrate 200 to correspond to the gate lines GL, the data lines DL, and the thin film transistors TFT. In addition, a color filter layer (not shown) is formed to correspond to at least the pixel areas.

As occasion demands, an overcoat layer 202 may further be formed over the entire surface of the second substrate 200, to compensate for steps between the black matrix layer 201 and the color filter layer (not shown).

The black matrix layer 201 extends from the active region A/A to the non-active area (around the active area A/A) of the second substrate 200, thereby overlapping a part of or the entire formation region of the seal pattern 250.

With a recent need for a narrow bezel, the non-active area of the liquid crystal display device is gradually decreasing. A boundary between the active area A/A and the non-active area should be shielded for the purpose of preventing leakage of light and therefore, the black matrix layer extends from the boundary between the active area A/A and the non-active area to the non-active area. In particular, in the case of a narrow bezel, the seal pattern 250 overlaps the extended black matrix layer 201. For this reason, when light is irradiated from the second substrate 200, on which the black matrix layer 201 is formed, during curing of the seal pattern 250 made of photo-curable conductive resin, light has difficulty being transmitted to the seal pattern 250. Therefore, it is inevitable to irradiate light from the first substrate 100 below the seal pattern 250.

Accordingly, to minimize a loss in the transmission of light required for photo curing, the liquid crystal display device of the present invention has an improved configuration of the first substrate 100.

Hereinafter, configurations of the common line pattern 101 and the transparent electrode pattern 113 connected to each other, which are formed in the non-active area of the first substrate 100, will be described in detail.

As shown in FIGS. 6 and 7, the common line pattern 101 includes a plurality of micro-scale lines, which extends in a direction corresponding to the conductive seal pattern while being spaced apart from one another within a width of the conductive seal pattern 250, and a common line connecting pattern 101a which extend in a direction intersecting the micro-scale lines so as to connect the micro-scale lines to one another. Here, the common line connecting pattern 101a serves to apply the same common voltage signal to the respective micro-scale lines of the common line pattern 101 and to allow the common voltage signal to be transmitted to the common electrode 203 by way of the seal pattern 250.

The transparent electrode pattern 113 includes a plurality of micro-scale line patterns, and has a length corresponding to a partial longitudinal length of the common line pattern 101 as shown in FIG. 6. That is, the common line pattern 101 is formed along the seal pattern 250, and the transparent electrode pattern 113 is selectively formed only in a predetermined region of the seal pattern 250.

In this case, the plurality of micro-scale line patterns of the transparent electrode pattern 113 are formed above the plurality of micro-scale lines of the common line pattern 101, to correspond to respective ones of the plurality of micro-scale lines. Also, the micro-scale line patterns of the transparent electrode pattern 113 have a width equal to or less than that of the micro-scale lines of the common line pattern 101. That is, the transparent electrode pattern 113 is not present in the spaces between the micro-scale lines of the common line pattern 101.

The micro-scale lines of the common line pattern 101 have a line width of 5~50 μm and are spaced apart from one another by a distance of 5~50 μm.

Here, the common line pattern 101 is located in the same layer as the gate lines GL and is made of the same light shielding metal as the gate lines GL.

The transparent electrode pattern 113 is located in the same layer as the pixel electrodes P and is made of the same transparent electrode material as the pixel electrodes P.

The gate insulating layer 111 is further formed between the gate lines GL and the data lines DL and in turn, the protection layer 112 is formed between the data lines DL and the pixel electrodes P. The gate insulating layer 111 and the protection layer 112 are formed on both the active area A/A and the non-active area. That is, both the gate insulating layer 111 and the protection layer 112 are formed even in a gap between the transparent electrode pattern 113 and the common line pattern 101.

As shown in FIGS. 7 and 8, the transparent electrode pattern 113 is connected to the common line pattern 101 via contact holes 115 formed through the protection layer 112 and the gate insulating layer 111.

A method for manufacturing the liquid crystal display device of the present invention will be described with reference to FIGS. 5 to 8.

First, the first substrate 100 and the second substrate 200, each of which includes the active area A/A defined in the center thereof and the non-active area around the active area A/A, are prepared.

Next, the plurality of gate lines GL and data lines DL are formed on the active area A/A of the first substrate 100 such that the gate lines GL and the data lines DL intersect each other so as to define the plurality of pixel areas. The thin film transistors TFT are formed at intersections of the respective gate lines GL and the respective data lines DL. The common line pattern 101 is formed on the non-active area of the first substrate 100. Here, the gate lines GL and the common line pattern 101 are located in the same layer and are made of the same light shielding metal.

Here, the common line pattern 101 includes the plurality of micro-scale lines extending in a given direction while being spaced apart from one another within a width region of the conductive seal pattern 250, and the common line connecting pattern 101a extending in a direction intersecting the micro-scale lines of the common line pattern 101 so as to connect the micro-scale lines to one another.

Also, the transparent electrode pattern 113 includes a plurality of micro-scale line patterns. In the formation of the transparent electrode pattern 113, the micro-scale line patterns of the transparent electrode pattern 113 are formed above the micro-scale lines of the common line pattern 101 to correspond to the respective micro-scale lines. Here, the transparent electrode pattern 113 has a length corresponding to a partial longitudinal length of the common line pattern 101.

The gate insulating layer 111 is formed between the gate lines GL and the data lines DL and the protection layer 112 is formed above the data lines DL. In this case, the gate insulating layer 111 and the protection layer 112 extend to cover the top of the common line pattern 111.

Next, predetermined portions of the protection layer 112 and the gate insulating layer 111 are removed, forming the contact holes 115.

Next, the pixel electrodes P are formed in the respective pixel areas and in turn, the transparent electrode pattern 113, which has a line width equal to or less than that of the common line pattern 101, is formed to overlap the common line pattern 101.

Next, the black matrix layer 201 is formed on the active area A/A of the second substrate 200 to correspond to the gate lines GL, the data lines DL, and the thin film transistors TFT and is also formed on the non-active area of the second substrate 200. Here, the black matrix layer 201 extends from an outer rim of the active area A/A to a partial region of the non-active area, for the purpose of preventing leakage of light.

Next, the color filter layer (not shown) is formed in the active area A/A to correspond to at least the pixel areas. Here, the color filter layer may overlap the black matrix layer 201 in the active area A/A and also, may be selectively formed to correspond to only the pixel areas.

Next, the overcoat layer 202 is formed over the black matrix layer 201 and the color filter layer (not shown) of the second substrate 200.

Next, the common electrode 203 is formed over the entire surface of the second substrate 200.

The conductive seal pattern 250 is formed on the first substrate 100 or the second substrate 200, to surround the non-active area.

Next, after the liquid crystal layer (not shown) is formed on the first substrate 100 or the second substrate 200, the first and second substrates 100 and 200 are bonded to each other.

Next, UV light is irradiated from the bottom of the first substrate 100, causing curing of the conductive seal pattern 250. In this case, the curing of the seal pattern 250 is accomplished as the UV light transmits through the spaces between the plurality of micro-scale lines of the common line pattern 101 and through the remaining border region of the first substrate 100 where the common line pattern 101 is not present. Here, since the transparent electrode pattern 113 has a line width equal to or less than that of the common line pattern 101, the remaining region of the first substrate 100 except for the common line pattern 101 allows all of the UV light to be transmitted to the seal pattern 250, maximizing the amount of light used during the curing of the seal pattern 250.

The reason why the transparent electrode pattern 113 has a line width equal to or less than that of the common line pattern 101 is to achieve enhanced light transmissivity by reducing an area of the transparent electrode pattern 113 and increasing an opening ratio of the region where the transparent electrode pattern 113 is not present. In this way, light transmissivity of the region where the transparent electrode pattern 113 is not present is increased during curing of the conductive seal pattern 250, resulting in enhanced curing efficiency of the conductive seal pattern 250 and consequently, increasing adhesive strength between the conductive seal pattern 250 and a surface of the opposite substrate.

As occasion demands, the transparent electrode pattern 113 may be formed to have a process margin at left and right sides thereof in consideration of a metal-to-metal overlay margin with respect to the common line pattern 101. Even in this case, the transparent electrode pattern 113 may also maintain the spaces between the micro-scale lines of the common line pattern 101.

Here, the common line pattern 101 is connected to a common line (not shown) formed in the same layer as the gate lines GL, and transmits a common electrode signal received from a pad portion of the lower substrate 100 to the common electrode 203 by way of the transparent electrode pattern 113 and the conductive seal pattern 250.

In the liquid crystal display device and the method for manufacturing the same according to the present invention, the transparent electrode pattern 113 includes the plurality of micro-scale line patterns spaced apart from one another within the width of the conductive seal pattern 250. The transparent electrode pattern 113 has a reduced overlap area with the conductive seal pattern 250, thereby increasing transmissivity of UV light during curing of the conductive seal pattern 250.

The reason for providing the transparent electrode pattern 113 and the common electrode pattern 101 with a micro-scale line width is to maximize transmissivity of UV light during the curing of the conductive seal pattern 250, thereby achieving an enhanced curing efficiency of the conductive seal pattern 250 and an enhanced adhesive strength between the conductive seal pattern 250 and the opposite substrate, and preventing sealant detachment in extreme environments.

In this way, it was confirmed that no seal detachment occurs under an accelerated condition (e.g., even if a time of 180 hours passes under a temperature of 70° C. and a humidity of 90% or more).

As was experimentally confirmed, when only the common line pattern takes the form of micro-scale line patterns and the transparent electrode pattern over the entire micro-scale line patterns of the common line pattern is wider than the entire micro-scale line patterns of the common electrode pattern, adhesive strength of the cured conductive seal pattern 250 was 1.746 kgf. However, in the liquid crystal display device according to the present invention in which both the common line pattern and the transparent electrode pattern take the form of micro-scale line patterns, it was confirmed that adhesive strength of the conductive seal pattern 250 is increased to 1.833 kgf.

As is apparent from the above description, a liquid crystal display device and a method for manufacturing the same according to the present invention have the following effects.

Since a common line pattern overlapping a seal pattern takes the form of a micro-scale line pattern and a transparent electrode pattern connected to the common line pattern has a line width equal to or less than that of the common line pattern, all of light passing through a region where the common line pattern is not present can be used for photo curing of the seal pattern, resulting in enhanced curing efficiency of the seal pattern.

In particular, with an increase in the irradiation amount of light, the cured seal pattern can achieve an enhanced adhesive strength with respect to upper and lower substrates. This can prevent a seal detachment problem even under extreme environment of a high temperature or high humidity.

In conclusion, it is possible to prevent a display failure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a first substrate and a second substrate arranged opposite each other, each of which includes an active area defined in the center thereof and a non-active area defined around the active area;
   a plurality of gate lines and data lines formed on the active area of the first substrate and arranged intersecting each other to define a plurality of pixel areas;
   thin film transistors formed at intersections of the respective gate lines and the respective data lines;
   pixel electrodes formed in the respective pixel areas;
   a common electrode formed over the entire surface of the second substrate;
   a conductive seal pattern configured to surround the non-active area of the first substrate or of the second substrate;
   a common line pattern formed on the first substrate to correspond to the conductive seal pattern; and
   a transparent electrode pattern configured to overlap the common line pattern with an insulating layer interposed therebetween, the transparent electrode pattern having a width equal to or less than that of the common line pattern.

2. The liquid crystal display device according to claim 1, wherein the common line pattern includes a plurality of micro-scale lines extending in a direction corresponding to the conductive seal pattern while being spaced apart from one another within a width of the conductive seal pattern, and a common line connecting pattern extending in a direction intersecting the micro-scale lines so as to connect the micro-scale lines to one another.

3. The liquid crystal display device according to claim 2, wherein the transparent electrode pattern is formed to correspond to a partial longitudinal length of the common line pattern.

4. The liquid crystal display device according to claim 3, wherein the transparent electrode pattern includes a plurality of micro-scale line patterns formed above the micro-scale lines of the common line pattern to correspond to the respective micro-scale lines.

5. The liquid crystal display device according to claim 4, wherein the transparent electrode pattern is not present between the micro-scale lines of the common line pattern.

6. The liquid crystal display device according to claim 2, wherein the transparent electrode pattern is connected to the micro-scale lines via a plurality of contact holes formed in the insulating layer.

7. The liquid crystal display device according to claim 2, wherein the micro-scale lines have a width of 5 μm to 50 μm and are spaced apart from one another by a distance of 5 μm to 50 μm.

8. The liquid crystal display device according to claim 1, wherein the common line pattern is formed in the same layer as the gate lines and is made of the same light shielding metal as the gate lines.

9. The liquid crystal display device according to claim 1, wherein the transparent electrode pattern is formed in the same layer as the pixel electrodes and is made of the same transparent electrode material as the pixel electrodes.

10. The liquid crystal display device according to claim 1, wherein the conductive seal pattern is made of photo curable resin.

11. The liquid crystal display device according to claim 1, further comprising a black matrix layer formed on the second substrate to correspond to the conductive seal pattern.

* * * * *